(12) United States Patent
Kim et al.

(10) Patent No.: US 8,822,358 B2
(45) Date of Patent: Sep. 2, 2014

(54) POLYESTER FABRICS FOR AIRBAG AND PREPARATION METHOD THEREOF

(75) Inventors: Jae-Hyung Kim, Gumi-si (KR);
Dong-Jin Kwak, Daegu (KR);
Jung-Hoon Youn, Gumi-si (KR);
Sang-Mok Lee, Gumi-si (KR); Hee-Jun Kim, Daegu (KR); Ki-Jeong Kim, Yeongcheon-si (KR); Sang-Kil Lee, Chungcheongnam-do (KR)

(73) Assignee: Kolon Industries, Inc., Kwacheon (KR)

( * ) Notice: Subject to any disclaimer, the term of this patent is extended or adjusted under 35 U.S.C. 154(b) by 173 days.

(21) Appl. No.: 13/265,998

(22) PCT Filed: Apr. 22, 2010

(86) PCT No.: PCT/KR2010/002534
§ 371 (c)(1),
(2), (4) Date: Oct. 24, 2011

(87) PCT Pub. No.: WO2010/123298
PCT Pub. Date: Oct. 28, 2010

(65) Prior Publication Data
US 2012/0043742 A1     Feb. 23, 2012

(30) Foreign Application Priority Data
Apr. 23, 2009   (KR) .................. 10-2009-0035714

(51) Int. Cl.
*D03D 1/02*   (2006.01)
(52) U.S. Cl.
CPC ........................... *D03D 1/02* (2013.01)
USPC ........ 442/301; 280/728.1; 428/357; 428/364; 139/383 R

(58) Field of Classification Search
CPC ..... D03D 1/02; D03D 1/04; D10B 2505/124; D10B 2331/04; D10B 2401/063; D06N 2211/268; D06N 3/0006; D06N 3/0036; D06N 3/128; D01F 6/00
USPC ......... 280/728.1, 743.1, 730.2; 442/164, 182, 442/189, 301; 26/51, 89; 428/357, 364, 428/365, 480; 139/383 R
See application file for complete search history.

(56) References Cited

U.S. PATENT DOCUMENTS

| 5,622,771 A | 4/1997 | Chiou et al. |
| 5,637,114 A | 6/1997 | Höhnke |

(Continued)

FOREIGN PATENT DOCUMENTS

| CN | 1063240 C | 8/1992 |
| CN | 1771153 A | 5/2006 |

(Continued)

OTHER PUBLICATIONS

Chinese Patent Office, Chinese Office Action issued in corresponding CN Application No. 201080018089.4, dated Nov. 9, 2012.

(Continued)

*Primary Examiner* — Arti Singh-Pandey
(74) *Attorney, Agent, or Firm* — Sughrue Mion, PLLC

(57) ABSTRACT

Disclosed is a fabric for an airbag including a polyester fiber, and particularly to a polyester fabric for an airbag of which toughness is 3.5 to 6.0 kJ/m$^3$ and tearing strength measured according to the ASTM D 2261 TONGUE method is 18 to 30 kgf, wherein the fabric includes polyester fiber of which toughness is 70 to 95 J/m$^3$, a method of preparing the same, and an airbag for a car including the same.

14 Claims, 3 Drawing Sheets

(56) References Cited

U.S. PATENT DOCUMENTS

| | | | |
|---|---|---|---|
| 7,498,280 B2 * | 3/2009 | DeBenedictis et al. | 442/181 |
| 2006/0252322 A1 | 11/2006 | DeBenedictis et al. | |
| 2013/0033027 A1 * | 2/2013 | Kim et al. | 280/743.1 |

FOREIGN PATENT DOCUMENTS

| | | |
|---|---|---|
| CN | 101205650 A | 6/2008 |
| DE | 44 01 003 A1 | 7/1995 |
| EP | 0 682 136 A1 | 11/1995 |
| EP | 1 054 084 A1 | 11/2000 |
| JP | 04-214437 A | 8/1992 |
| JP | 0748717 A | 2/1995 |
| JP | 2000-513413 A | 10/2000 |
| JP | 2003528991 A | 9/2003 |
| JP | 2006526079 A | 11/2006 |
| KR | 10-0546462 B1 | 4/2006 |
| KR | 10-2009-0030727 A | 3/2009 |
| WO | 9510652 A1 | 4/1995 |
| WO | 97/49849 A2 | 12/1997 |

OTHER PUBLICATIONS

European Patent Office, European Search Report issued in corresponding EP Application No. 10767312.1, dated Mar. 25, 2013.
Japan Patent Office, Communication dated Jul. 1, 2014, issued in corresponding Japanese application No. 2012-507156.

* cited by examiner

POLYESTER FABRICS FOR AIRBAG AND PREPARATION METHOD THEREOF

CROSS REFERENCE TO RELATED APPLICATIONS

This application is a National Stage of International Application No. PCT/KR2010/002534 filed Apr. 22, 2010, claiming priority based on Korean Patent Application No. 10-2009-0035714 filed Apr. 23, 2009, the contents of all of which are incorporated herein by reference in their entirety.

BACKGROUND OF THE INVENTION (a) Field of the Invention

The present invention relates to a fabric for an airbag and a method of preparing the same, and particularly to a fabric for an airbag that includes a polyester fiber having low modulus, high strength, and high elongation, and has superior mechanical properties, such as toughness, tearing strength, and the like, a method of preparing the same, and an airbag for a car including the same.

(b) Description of the Related Art

Generally, an airbag is an apparatus for protecting a driver and passengers by providing a gas into the airbag by exploding gunpowder so as to inflate the airbag after detecting a crash impact with an impact detecting sensor, when a driving car collides at a speed of about 40 km/h or more.

Characteristics required of the fabric for an airbag are low air permeability for unfolding the airbag well at the time of collision, high strength and high heat resistance for preventing damage to and rupture of the airbag itself, and flexibility for reducing the impact provided to occupants.

Particularly, the airbag for a car is prepared in a certain shape and installed in a steering wheel, door roof rails, or side pillars of the car in a folded form so as to minimize its volume, and it is expanded and unfolded when an inflator operates.

Therefore, it is very important that the airbag has folding properties and flexibility for reducing the shock to the occupant in addition to good mechanical properties of the fabric for maintaining the folding and packaging properties of the airbag effectively when it is installed in a car, preventing damage to and rupture of the airbag itself, providing good unfolding properties of the airbag cushion, and minimizing the impact provided to the occupant. However, an airbag fabric that can maintain superior air-tightness and flexibility for the occupant's safety, sufficiently endure the impact applied to the airbag, and be effectively installed in a car has not yet been suggested.

Previously, a polyamide fiber such as nylon 66 has been used as the raw material of the fiber for an airbag. However, nylon 66 has superior impact resistance but is inferior to polyester fiber in humid heat resistance, light resistance, and shape stability, and is expensive.

Meanwhile, Japanese patent publication No. Hei 04-214437 suggested a polyester fiber for reducing such defects. However, when the airbag was prepared by using a prior polyester fiber, it was difficult to install in a narrow space in a car because of its high stiffness, excessive thermal shrinkage was caused by a heat-treatment at a high temperature due to its high modulus and low elongation, and there was a limitation for maintaining sufficient mechanical and unfolding properties in severe conditions of high temperature and high humidity.

Therefore, it is needed to develop a fabric that maintains superior mechanical properties and air-tight effect so as to be used as an airbag fabric for a car, and also maintains flexibility for reducing the impact applied to occupants, the packing properties, and superior mechanical properties in the severe conditions of high temperature and high humidity.

SUMMARY OF THE INVENTION

It is an aspect of the present invention to provide a polyester fabric for an airbag that secures superior mechanical, flexibility, and packing properties in order to be used as an airbag fabric, and that maintains sufficient performance in severe conditions of high temperature and high humidity.

It is another aspect of the present invention to provide a method of preparing the polyester fabric for an airbag.

It is still another aspect of the present invention to provide an airbag for a car including the polyester fabric for an airbag.

The present invention provides a polyester fabric for an airbag having toughness defined by Calculation Formula 1 of 3.5 to 6.0 kJ/m³, and tearing strength measured according to the ASTM D 2261 TONGUE method of 18 to 30 kgf, wherein the fabric includes a polyester fiber having toughness defined by Calculation Formula 1 of 70 to 95 J/m³.

$$\text{Toughness(Work of rupture)} = \int_0^{break} F \cdot dl \qquad \text{[Calculation Formula 1]}$$

Herein,

F represents the load that is provided to the polyester fiber or fabric until the length of the fiber or the fabric is elongated as much as dl, and dl represents the elongated length of the polyester fiber or fabric.

The present invention also provides a method of preparing the polyester fabric for an airbag, including the steps of weaving a raw fabric for an airbag from polyester fibers, scouring the woven raw fabric for an airbag, and tentering the scoured fabric.

The present invention also provides an airbag for a car including the polyester fabric for an airbag.

DETAILED DESCRIPTION OF THE EMBODIMENTS

Figure 1:
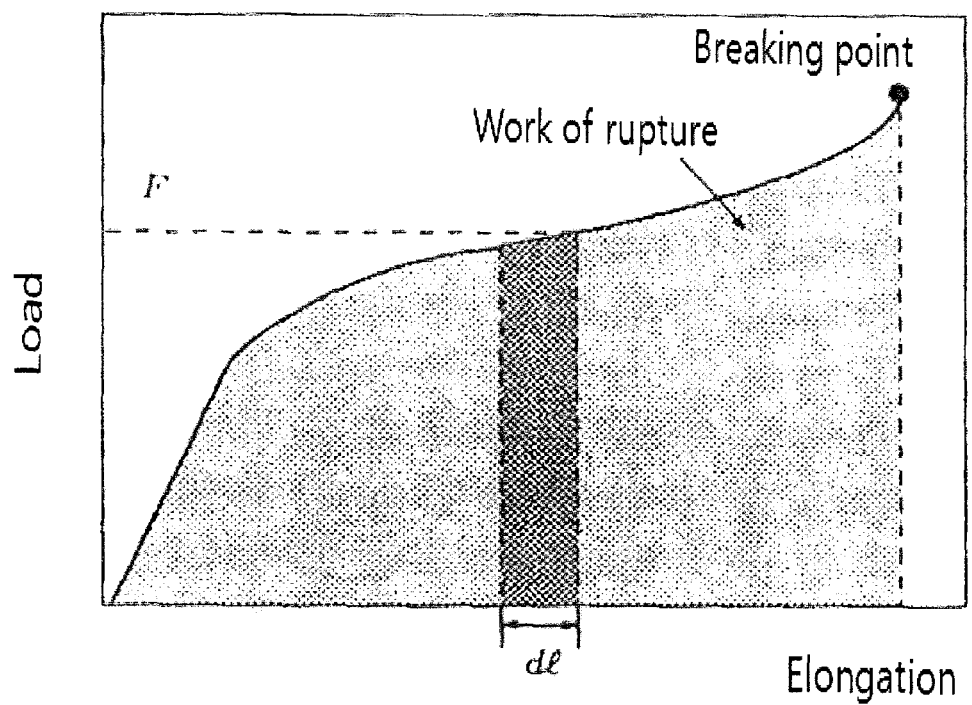
FIG. 1 shows an example of the tenacity-elongation curve of a conventional fiber, and the area of the tenacity-elongation curve may be defined as toughness (work of rupture, J/m³).

Hereinafter, the polyester fabric for an airbag according to embodiments of the present invention, the method of preparing the same, and the airbag for a car including the same are explained in more detail. However, the followings are only for the understanding of the present invention and the scope of the present invention is not limited to or by them, and it is obvious to a person skilled in the related art that the embodiments can be variously modified in the scope of the present invention.

In addition, "include" or "comprise" means to include any components (or ingredients) without particular limitation unless there is no particular mention about them in this description, and it cannot be interpreted as a meaning of excluding an addition of other components (or ingredients).

In the present invention, the fabric for an airbag means a woven fabric or a nonwoven fabric that is used for preparing the airbag for a car. A nylon 6 plain fabric woven by a Rapier loom or a nylon 6 nonwoven fabric has been used as a conventional fabric for an airbag. However, the fabric for an airbag of the present invention is characterized in that the basic properties of the fabric such as shape stability, air permeability, stiffness, and the like are good by using a polyester fiber.

Although there have been many attempts to apply polyester to the fabric or fiber for an airbag, disadvantages of the prior polyester fibers should be overcome in order to apply the polyester to the fiber for an airbag instead of the prior polyamide such as nylon 66. Particularly, the prior polyester fibers have some deteriorated properties such as low folding properties according to its high modulus and stiffness, falling-off of properties in severe conditions of high temperature and high humidity according to its low melt heat capacity, and a decline in unfolding performance according to the same.

Polyester has a stiffer structure than that of nylons in terms of molecular structure, and has a characteristic of high modulus. Therefore, the packing properties deteriorate remarkably when it is used for the fabric for an airbag and installed in a car. Furthermore, carboxyl end groups (hereinafter "CEG") in the polyester molecular chain attack ester bonds in the condition of high temperature and high humidity and cut the chain, and it become a cause of deterioration of the properties after aging.

Accordingly, the present invention can maintain superior shape stability, air-tight performance, and the like of the fabric while remarkably lowering the stiffness, and can obtain the increased effect of improving the properties as the fabric for an airbag by optimizing the ranges of the properties such as toughness and tearing strength of the fabric by using the polyester fiber having low modulus, high tenacity, and high elongation.

Particularly, it is revealed from the results of the present inventor's experiments that a fabric for an airbag shows more improved folding properties, shape stability, and air-tight effect by using the polyester fabric having above characteristics as the fabric for an airbag. The fabric for an airbag can maintain superior packing properties, superior mechanical properties, air-leakage protection, insulating properties, and air-tightness, and the like even under the severe conditions of high temperature and high humidity.

According to one embodiment of the present invention, a polyester fabric having specific characteristics is provided. The polyester fabric, that is, the polyester fabric for an airbag, may be a fabric of which toughness defined by Calculation Formula 1 is 3.5 to 6.0 kJ/m$^3$ and tearing strength measured according to the ASTM D 2261 TONGUE method is 18 to 30 kgf, wherein the fabric includes a polyester fiber of which toughness defined by Calculation Formula 1 is 70 to 95 Pd.

$$\text{Toughness(Work of rupture)} = \int_0^{break} F \cdot dl \quad \text{[Calculation Formula 1]}$$

Herein,
F represents a load that is provided to the polyester fiber or fabric until the length of the fiber or the fabric is elongated as much as dl, and
dl represents the elongated length of the polyester fiber or fabric.

As results of the present inventors, it is revealed that the fiber and the fabric can be effectively used for an airbag by using the particular polyester fiber and fabric having superior toughness (work of rupture) to absorb and endure the energy from the gas of a high temperature and high pressure. Particularly, when the toughness of the polyester fiber for an airbag is 70 J/m$^3$ to 95 J/m$^3$, and preferably 75 J/m$^3$ to 90 J/m$^3$, and the toughness of the fabric for an airbag is 3.5 kJ/m$^3$ to 6.0 kJ/m$^3$, and preferably 3.8 kJ/m$^3$ to 5.7 kJ/m$^3$, the fiber and the fabric for an airbag can absorb and endure the energy of the gas effectively.

Here, the toughness is the energy that is spent until the fiber (which covers fiber or fabric, hereinafter the same as above) is broken by a tensile force as shown in Calculation Formula 1. It means the resistance of the fiber against a sudden impact. When a certain fiber is elongated from l to l+dl by a certain load F, the work done at this time is defined as F·dl and thus the toughness that is needed to break the fiber is calculated by Calculation Formula 1. That is, such toughness represents the cross-sectional area of the tenacity-elongation curve of the fiber and the fabric (see FIG. 1), and the fabric has higher toughness as the tenacity and the elongation of the fiber that is used to the fabric becomes higher. Particularly, if the toughness of the fabric for an airbag is low, the resistance of the fabric that can absorb the momentary expansion impact of the inflator having a high temperature and high pressure becomes low and thus it brings about a result that the fabric for an airbag is easily torn when the airbag is unfolded. Therefore, when the toughness of the fabric is below 3.5 kJ/m$^3$, for example, it may be difficult to be applied as the fabric for an airbag.

At the same time, the fabric for an airbag of the present invention requires superior tearing strength according to a stress concentration when the airbag is expanded by a momentary strong force of a high temperature and high pressure gas while the airbag is unfolded. At this time, the tearing strength of the fabric for an airbag that represents the burst strength may be 18 to 30 kgf when it is measured according to the ASTM D 2261 TONGUE method by using a non-coated fabric, and the tearing strength of the coated fabric may be 30 to 60 kgf when it is measured according to the ASTM D 2261 TONGUE method. Here, if the tearing strengths of the non-coated fabric and the coated fabric for an airbag are below 18 kgf and 30 kgf respectively, the airbag may burst when the airbag is unfolded and it may cause a huge danger in function of the airbag. On the contrary, if the tearing strengths of the non-coated fabric and the coated fabric for an airbag are over the upper limits, that is, over 30 kgf and 60 kgf respectively, it may be undesirable because the edge comb resistance of the fabric becomes lower and the air-tightness deteriorates rapidly when the airbag is unfolded.

Furthermore, the polyester generally has a stiffer structure than that of nylons in terms of molecular structure and shows a characteristic of high modulus, and it is difficult to install the airbag in a narrow space of a car when it is used to the fabric for an airbag because the folding properties and the packing properties of the same deteriorate remarkably. However, the present invention can maintain the toughness and the tearing strength of the fabric and lower the stiffness of the fabric remarkably at the same time by using the polyester fiber having high strength and low modulus characteristics. The stiffness of the fabric for an airbag of the present invention that is measured according to the ASTM D 4032 method may be 1.5 kgf or less or 0.3 to 1.5 kgf, preferably 1.2 kgf or less or 0.3 to 1.2 kgf, and more preferably 0.8 kgf or less or 0.3 to 0.8 kgf. The fabric for an airbag of the present invention can show superior folding properties and flexibility, and improves packing properties when the airbag is installed by remarkably lowering the stiffness of the fabric in comparison with prior polyester fabrics.

The fabric of the present invention is preferable to maintain said range of stiffness in order to effectively use it for an airbag. If the stiffness is too low, it may not function as a sufficient protecting support when the airbag is expanded, and the packing properties may also be deteriorated when it is installed in a car because its shape stability becomes poor. Furthermore, the stiffness may preferably be 1.5 kgf or less in order to prevent the fabric from becoming rigid and hard to be folded, the packing properties from being deteriorated, and the fabric from being discolored. Particularly, the stiffness of the fabric for an airbag may be 0.8 kgf or less in the case of being 460 denier or less of the total fineness, and 1.2 kgf or less in the case of being 530 denier or more of the total fineness.

The static air permeability of the fabric for an airbag that is measured according to the ASTM D 737 method when the fabric is non-coated and $\Delta P$ is 125 Pa may be 10.0 cfm or less, for example, 0.3 to 10.0 cfm, preferably 8.0 cfm or less, for example, 0.3 to 8.0 cfm, and more preferably 5.0 cfm or less, for example, 0.3 to 5.0 cfm. When the fabric is non-coated and $\Delta P$ is 500 Pa, the static air permeability may be 14 cfm or less, for example, 4 to 14 cfm, and preferably 12 cfm or less, for example, 4 to 12 cfm. Furthermore, the dynamic air permeability of the fabric for an airbag that is measured according to the ASTM D 6476 method may be 1700 mm/s or less, preferably 200 to 1600 mm/s, and more preferably 400 to 1400 mm/s. The static air permeability means the amount of the air that penetrates through the fabric in the condition of applying a certain pressure to the fabric. The static air permeability may be lower as the fineness of monofilament (denier per filament) is smaller and the density of the fabric becomes higher. Furthermore, the dynamic air permeability means the degree of air penetration through the fabric when an average instant differential pressure of 30-70 kPa is applied. The dynamic air permeability may be lower as the fineness of monofilament (denier per filament) is smaller and the density of the fabric is higher, like the static air permeability.

Particularly, the air permeability of the fabric for an airbag can be apparently lowered by forming a coated layer of a rubber material on the fabric, which makes it possible to lower the air permeability to almost 0 cfm. Particularly, the air permeability of the coated fabric for an airbag of the present invention that is measured according to the ASTM D 737 method may be 0.1 cfm or less, for example, 0 to 0.1 cfm, and preferably 0.05 cfm or less, for example, 0 to 0.05 cfm when $\Delta P$ is 125 Pa. The air permeability of the coated fabric for an airbag may be 0.3 cfm or less, for example, 0 to 0.3 cfm, and preferably 0.1 cfm or less, for example, 0 to 0.1 cfm when $\Delta P$ is 500 Pa.

If the static air permeability or the dynamic air permeability of the non-coated or coated fabric is over the upper limit of the above range, it may be undesirable in the aspect of maintaining the air-tightness of the fabric for an airbag.

The elongation at break of the fabric for an airbag that is measured according to the ASTM D 5034 method at room temperature may be 25% to 60%, and preferably 30% to 50%. It is preferable that the elongation at break is 25% or more in the aspect of the toughness. It is also preferable that the elongation at break is not over 60% in the aspect of the edge comb resistance.

The shrinkage rates in the directions of warp and weft of the fabric measured according to the ASTM D 1776 method may be 1.0% or less, and preferably 0.8% or less, respectively. It is most preferable that the shrinkage rates in the directions of warp and weft do not exceed 1.0% in the aspect of the shape stability of the fabric.

Meanwhile, in order to secure superior performance of the fabric for an airbag, various aging processes may be preferably carried out so as to maintain the improved properties of the fabric. The aging process of the fabric for an airbag may be at least one process selected from the group consisting of heat aging, cycle aging, and humidity aging. Preferably, the fabric for an airbag of the present invention may excellently maintain the tenacity and the properties even after the three aging processes, i.e., heat aging, cycle aging, and humidity aging.

Here, the heat aging may be carried out by heat-treating the fabric at a high temperature, and preferably at a temperature of 110 to 130° C., for 300 hours or more, for example, 300 to 500 hours. The cycle aging may be carried out by repeating the heat aging, the humidity aging, and the cold aging to the fabric. Particularly, the cycle aging may be processed by repeating the following three aging steps 2 to 5 times: aging the fabric at a temperature of 30 to 45° C. and relative humidity of 93 to 97% RH for 12 to 48 hours, aging the fabric at 70 to 120° C. for 12 to 48 hours, and aging the fabric at −10 to −45° C. for 12 to 48 hours. The humidity aging may be carried out by aging the fabric in a condition of high temperature and high humidity, and preferably at a temperature of 60 to 90° C. and relative humidity of 93 to 97% RH for 300 hours or more, for example, 300 to 500 hours.

Particularly, the strength retention that is calculated as the percentage of the strength measured after aging the fabric for an airbag of the present invention as disclosed above, on the basis of the strength measured at room temperature, may be 80% or more, preferably 85% or more, and more preferably 90% or more. Therefore, the fabric of the present invention can exhibit superior performance as the fabric for an airbag because the tenacity and strength retention of the fabric is maintained in the superior range even after applying the aging process in the severe conditions, for example, at a high temperature and high humidity for a long time.

Meanwhile, according to another embodiment of the present invention, the polyester fabric made of the polyester fibers having specific characteristics is provided. The polyester fabric may include a polyester fiber having 110 or more filaments and fineness of the monofilament of 2.9 to 6.0 DPF.

Particularly, the present invention can provide the polyester fabric for an airbag having superior shape stability, airtightness, and folding properties, as well as superior energy absorbing ability while the airbag expands, by using the polyester fiber having high strength, high elongation, and low modulus instead of a prior polyester fiber having high strength, low elongation, and high modulus.

The polyester fiber prepared from the polyester chips having intrinsic viscosity of 1.05 to 1.40 dl/g, preferably 1.10 to 1.35 dl/g, and more preferably 1.15 to 1.35 dl/g, can be used for the fabric for an airbag of the present invention. It is preferable that the intrinsic viscosity of the polyester chips is 1.05 dl/g or more so that the fabric for an airbag prepared by using the chips maintains the superior properties after aging at room temperature and even under the severe conditions of high temperature and high humidity. Furthermore, it is preferable that the intrinsic viscosity of the polyester chips is 1.40 dl/g or less, and preferably 1.35 dl/g or less, in order to exhibit the low shrinkage characteristic of the fabric prepared by using the chips.

The shrinkage stress of the polyester fiber may preferably be 0.005 to 0.075 g/d at a temperature of 150° C., which is the temperature corresponding to the laminate coating temperature of common coated fabrics. It is also preferably 0.005 to 0.075 g/d at a temperature of 200° C., which is the temperature corresponding to the sol coating temperature of common coated fabrics. That is, when the shrinkage stresses at 150° C. and 200° C. are 0.005 g/d or more, respectively, it is possible to prevent the fabric from sagging because of the heat of the coating process. Also, when the shrinkage stresses at 150° C. and 200° C. are 0.075 g/d or less, respectively, it is possible to decrease the relaxing stress during the cooling process at room temperature after the coating process.

Furthermore, the shrinkage rate at 177° C. of the polyester fiber is preferably 6.5% or less, in order to maintain the weaving type under tension over a certain level during heat-treating in the coating process and to prevent shape deformation of the fabric for an airbag.

The shrinkage stress defined in the present invention is based on the value measured under the fixed load of 0.10 g/d, and the shrinkage rate is based on the value measured under the fixed load of 0.01 g/d.

The polyester fiber is preferably poly(ethylene terephthalate) (PET) fiber among common polyesters, more preferably the PET fiber including the PET in an amount of 70 mol % or more, or 90 mol % or more.

The polyester fiber must maintain high strength and low fineness to be used effectively for the fabric for an airbag, and thus the total fineness of the fiber may be 400 to 650 denier. Furthermore, it is preferable that the number of filaments of the fiber may be 110 to 210, and preferably 130 to 180, because a greater number of filaments of the fiber can give a softer feel but too high a number of filaments is not good in terms of spinnability.

Particularly, the fabric for an airbag of the present invention may use the polyester fiber having a superior modulus (Young's modulus) measured according to the ASTM D 885 method. The modulus (Young's modulus) of the polyester fiber may be 60 to 100 g/de, and preferably 75 to 95 g/de, at 1% elongation, i.e., at the point of being elongated 1%. Also, the modulus (Young's modulus) of the polyester fiber may be 20 to 60 g/de, and preferably 22 to 55 g/de, at 2% elongation, i.e., at the point of being elongated 2%. In comparison, the modulus (Young's modulus) of the prior industrial polyester fiber is 110 g/de or more at 1% elongation and 80 g/de or more at 2% elongation, but the present invention can make the fabric for an airbag by using the polyester fiber having a remarkably low modulus.

The modulus of the polyester fiber means a modulus value of elasticity that is obtained from a gradient in an elastic range of a strength-strain graph obtained by tensile test, and corresponds to a coefficient value of elasticity indicating a degree of elongation and a degree of deformation when the fiber is stretched in both directions. When the modulus of the fiber is high, the elasticity is good but the stiffness of the fabric may become bad. On the other hand, when the modulus is too low, the stiffness of the fabric is good but the elastic recovery becomes low and the toughness of the fabric may become bad. As such, since the fabric for an airbag is prepared from the polyester fiber having a lower initial modulus than that of the prior fiber for industrial applications, the fabric can resolve the problem caused by the high stiffness of the prior polyester fabric, and can show superior folding properties, flexibility, and packing properties.

Furthermore, the polyester fiber may show the tensile tenacity of 8.3 g/d or more, preferably 8.3 to 9.5 g/d, and more preferably 8.6 g/d to 9.3 g/d, and the elongation at break of 14% to 24%, and preferably 17% to 22%. The dry heat shrinkage of the fiber may be 6.5% or less, for example, 1.0% to 6.5%, and preferably 1.2% to 5.0%.

As disclosed above, the polyester fabric of the present invention can exhibit superior performance when it is used as the fabric for an airbag, by using the polyester fiber having the intrinsic viscosity, the initial modulus, and the elongation in the optimized range.

The polyester fiber can be prepared by melt-spinning the PET polymer so as to prepare an undrawn fiber and drawing the undrawn fiber. It is possible to produce a polyester fiber that can be effectively used to the fabric for an airbag of the present invention because the concrete conditions and processing methods of each above step are directly/indirectly reflected in the properties of the polyester fiber.

Particularly, in a more preferable embodiment, the low modulus polyester fiber having high strength and high elongation may be prepared by the method including the steps of melt-spinning the high viscosity polymer including 70 mol % or more of PET, of which the intrinsic viscosity is 1.05 dl/g or more, at a low temperature, for example at 200 to 300° C., so as to prepare the polyester undrawn fiber, and drawing the polyester undrawn fiber with the drawing ratio of 5.0 to 6.0. At this time, it is possible to maximally suppress the decrease of the intrinsic viscosity and the increase of the carboxyl end group (CEG) content of the fiber, and to secure the high elongation characteristic while maintaining superior mechanical properties of the fiber, by melt-spinning the high viscosity PET polymer of which the CEG content is low, preferably 30 meq/kg or less, at a low temperature condition, and preferably by melt-spinning the same under the conditions of low temperature and low speed. Furthermore, the low modulus polyester fiber having high tenacity and high elongation can be prepared and applied to the fabric for an airbag by carrying out the succeeding drawing process with the optimized drawing ratio of 5.0 to 6.0 and suppressing the elongation deterioration of the fiber.

Here, when the melt-spinning process is carried out at a high temperature, for example at a temperature of over 300° C., a large amount of thermal degradation of the PET polymer is caused, the decrease in the intrinsic viscosity and the increase in the CEG content may be enlarged, the decrease in the elongation and the increase in the modulus may be enlarged because of the orientation of the molecules increases at the high temperature, and the deterioration of overall properties may be caused by damage in the surface of the fiber, and thus it is undesirable. If the drawing process is carried out with too high a drawing ratio, for example with a drawing ratio of over 6.0, it may be an excess drawing level and may generate fiber scission or hairiness, and the polyester fiber prepared by the method has difficulty in exhibiting the preferable properties to be applied to the fabric for an airbag. Furthermore, if the drawing process is carried out with a relatively low drawing ratio, the tenacity of the prepared polyester fiber may be partially decreased because the degree of orientation of the fiber is low, and thus it is preferable that the drawing process is carried out with the drawing ratio of 5.0 or more in order to prepare the low modulus polyester fiber having high strength and high elongation that is suitable to be applied to the fabric for an airbag.

Meanwhile, the overall conditions of succeeding processes may be controlled to a preferable range, for example the relaxing ratio may be preferably controlled to be 11% to 14%, in the aspect of preparing the low modulus polyester fiber having high strength and high elongation with the high drawing ratio condition.

The polyester fiber for an airbag having a low initial modulus and high strength and high elongation can be obtained through the process optimization disclosed above. Furthermore, it is possible to minimize the content of the carboxyl end group (CEG) that exists as an acid under a high humidity condition and causes the scission of basic molecular chains of the polyester fiber, through the optimization of the melt-spinning and drawing processes. Therefore, such polyester fiber shows a low initial modulus and a high elongation range at the same time, and may be preferably applied to the fabric for an airbag having superior mechanical properties, packing properties, shape stability, impact resistance, and air-tight effect.

Meanwhile, according to still another embodiment of the present invention, the fabric for an airbag of the present invention may further include a coating layer of a rubber component that is coated or laminated on its surface. The rubber component may be at least one selected from the group consisting of a powder-type silicone, a liquid-type silicone, polyurethane, chloroprene, a neoprene rubber, and an emulsion-type silicone resin, but the kinds of the coated rubber component are not limited to the above materials. However, the silicone coating is preferable in the aspect of environmental friendliness and mechanical characteristics.

The amount of the coated rubber component per unit area of the coating layer of rubber component may be 20 to 200 $g/m^2$, and preferably 20 to 100 $g/m^2$. Particularly, the amount is preferably 30 $g/m^2$ to 95 $g/m^2$ in the case of a OPW (one piece woven) type of fabric for a side curtain airbag, and the amount is preferably 20 $g/m^2$ to 50 $g/m^2$ in the case of a plain-type fabric for an airbag.

Furthermore, the method of preparing the fabric for an airbag using the polyester fiber is provided according to still another embodiment of the present invention. The present method of preparing the fabric for an airbag includes the steps of weaving a non-coated fabric for an airbag by using the polyester fiber, scouring the woven non-coated fabric for an airbag, and tentering the scoured fabric.

In the present invention, the polyester fiber can be prepared into the final fabric for an airbag through a conventional weaving method, and scouring and tentering processes. At this time, the weaving type of the fabric is not limited to a particular type, and both weaving types of a plain type and a one piece woven (OPW) type are preferable.

Particularly, the fabric for an airbag of the present invention may be prepared through the processes of beaming, weaving, scouring, and tentering by using the polyester fiber as warps and wefts. The fabric may be prepared by using a conventional weaving machine, and it is not limited to any particular weaving machine. However, the plain-type fabrics may be prepared by using a Rapier Loom, a Water Jet Loom, and the like, and the OPW-type fabrics may be prepared by a Jacquard Loom.

However, the present invention can carry out the heat-treating process at a higher temperature than prior processes by using the polyester fiber of high strength and high elongation having a low shrinkage rate in comparison with prior fibers. That is, the present invention can carry out the curing process at the vulcanizing temperature of 140 to 210° C., preferably 160 to 200° C., and most preferably 175 to 195° C. after coating the tentered fabric with the rubber component and drying the same, via the processes of scouring and tentering the woven raw fabric. The vulcanizing temperature must be 140° C. or more in the aspect of maintenance of the mechanical properties such as the tearing strength of the fabric and the like, and must be 210° C. or less in the aspect of stiffness. Particularly, the heat-treating process can be carried out with multiple steps, and for example, it is possible to carry out a $1^{st}$ heat-treating process at 150 to 170° C., a $2^{nd}$ heat-treating process at 170 to 190° C., and a $3^{rd}$ heat-treating process at 190 to 210° C.

When the polyester fabric of the present invention is prepared through the heat-treating process at a high temperature, the effects of superior shape stability, air-tightness, improved stiffness, and tearing strength can be largely provided to the fabric by improving the weaving density and the like because of the low shrinkage rate characteristic of the polyester fiber itself.

Furthermore, the curing time at the vulcanizing temperature may be 30 to 120 seconds, preferably 35 to 100 seconds, and most preferably 40 to 90. Here, when the curing time is below 30 seconds, there is a problem that the curing process of the coating layer of the rubber component is not fulfilled, the mechanical properties of the fabric deteriorates, and the coating layer peels, and when the curing time is over 120 seconds, there is also a problem that the stiffness and the thickness of the final fabric is increased and the folding properties deteriorate.

The fabric for an airbag of the present invention may be coated by the rubber component disclosed above on one side or both sides, and the coating layer of the rubber component may be formed by a knife-over-roll coating method, a doctor blade method, or a spray coating method, but it is not limited to the methods mentioned above.

The coated fabric for an airbag may be prepared into an airbag cushion form having a certain shape through the processes of tailoring and sewing. The airbag is not limited to any particular shape, and can be prepared into a general form.

Meanwhile, according to still another embodiment, the airbag for a car including the polyester fabric is provided. Furthermore, the airbag system including the airbag is provided, and the airbag system may be equipped with a common device that is well known to the related manufacturers.

The airbag may be largely classified into a frontal airbag and a side curtain airbag. There are airbags for the driver's seat, for passenger seats, for protecting sides, for protecting knees, for protecting ankles, and for protecting a pedestrian, as the frontal airbag, and the side curtain airbag protect the occupants from a broadside collision and rollover of a car. Therefore, the airbag of the present invention includes both the frontal airbag and the side curtain airbag.

As explained, according to the present invention, the polyester fabric for an airbag has shape stability, air-tightness, folding properties, and the like that are superior, and the airbag for a car obtained by using the same are provided by optimizing the toughness of the polyester fiber and the toughness and the tearing strength of the fabric itself.

The fabric for an airbag can minimize the thermal shrinkage by the heat-treating process of a high temperature because it uses the polyester fiber of a low modulus, high strength, and high elongation, and it is possible to obtain superior shape stability, mechanical properties, and air-tight effect when it is used for preparing the fabric for an airbag, and it is also possible to remarkably improve the packing properties by securing superior folding properties and flexibility and to protect the passenger safely by minimizing the impact applied to the passenger.

Therefore, the polyester fabric of the present invention can be very preferably used for preparing the airbag for a car.

EXAMPLES

Hereinafter, preferable examples and comparative examples are presented for understanding the present invention. However, the following examples are only for illustrating the present invention and the present invention is not limited to or by them.

Examples 1-5

After preparing polyester fibers from PET chips having a specific intrinsic viscosity through a melt-spinning apparatus in 1 step, the fibers were prepared into fabrics for an airbag through the processes of weaving the raw fabrics for an airbag by using a Rapier Loom and scouring and tentering the raw fabrics so as to prepare the fabrics for an airbag, and silicone-coated fabrics were prepared by coating a liquid-type silicone rubber resin on the fabrics with a knife-over-roll-coating method.

At this time, the intrinsic viscosity (IV) of the PET chip, the CEG content, the melt-spinning temperature, the drawing ratio, the intrinsic viscosity of the fiber, the modulus at 1% elongation and 2% elongation, the tensile tenacity, the warp and weft weaving density of the fabric, the weaving type, the heat-treating temperature, the rubber component, and the amount of the coated resin were as disclosed in the following Table 1, and the other conditions followed conventional conditions for preparing a polyester fiber.

TABLE 1

|  | Example 1 | Example 2 | Example 3 | Example 4 | Example 5 |
|---|---|---|---|---|---|
| PET content (mole %) | 100 | 100 | 100 | 100 | 100 |
| IV of PET chip (dl/g) | 1.14 | 1.22 | 1.40 | 1.22 | 1.40 |
| CEG content of PET chip (meq/kg) | 30 | 27 | 24 | 27 | 24 |
| Spinning temperature (° C.) | 293 | 295 | 295 | 297 | 297 |
| Drawing ratio | 5.95 | 6.03 | 6.10 | 6.03 | 6.10 |
| IV of fiber(dl/g) | 0.95 | 1.02 | 1.08 | 1.02 | 1.08 |
| Toughness of fiber (J/m$^3$) | 79 | 82 | 86 | 82 | 85 |
| Modulus of fiber (at 1% elongation, g/de) | 80 | 77 | 75 | 83 | 81 |
| Modulus of fiber (at 2% elongation, g/de) | 32 | 29.8 | 26.8 | 29.0 | 27.6 |
| Tensile tenacity of fiber (g/de) | 8.4 | 8.8 | 9.2 | 8.7 | 9.2 |
| Elongation at break of fiber (%) | 17 | 18 | 20 | 18 | 20 |
| Dry heat shrinkage rate (%) | 2.7 | 2.2 | 1.2 | 2.2 | 1.2 |
| Fineness of monofilament (DPF) | 3.82 | 3.23 | 2.92 | 5.45 | 4.17 |
| Total fineness (de) | 420 | 420 | 420 | 600 | 600 |
| Number of filaments | 110 | 130 | 144 | 110 | 144 |
| Weaving density (warp × weft) | 49 × 49 | 49 × 49 | 49 × 49 | 43 × 43 | 43 × 43 |
| Weaving type | Plain | Plain | Plain | Plain | Plain |
| Heat-treating/Vulcanizing temperature (° C.) 1st | 180 | 185 | 190 | 185 | 190 |
| Heat-treating/Vulcanizing temperature (° C.) 2nd | 180 | 185 | 190 | 185 | 190 |
| Rubber component | Liquid silicone | Liquid silicone | Liquid silicone | Liquid silicone | Liquid silicone |
| Amount of coated resin (g/m2) | 25 | 25 | 25 | 30 | 30 |

The properties of the polyester fibers and fabrics prepared according to Examples 1-5 were measured by the following methods, and the measured properties are listed in the following Table 2.

(a) Toughness of the Fiber/the Fabric

The toughness value (J/m$^2$) was calculated by Calculation Formula 1.

$$\text{Toughness(Work of rupture)} = \int_0^{break} F \cdot dl \quad \text{[Calculation Formula 1]}$$

Herein,
F represents the load that is provided to the polyester fiber or fabric until the length of the fiber or the fabric is elongated as much as dl, and
dl represents the elongated length of the polyester fiber or fabric.

At this time, the toughness of the fabric was measured on the non-coated fabric before coating.

(b) Tearing Strength

A sample was cut from the non-coated fabrics before coating and the coated fabrics after coating in the size of 75 mm wide×200 mm. The tearing strength of the fabric sample was measured according to the assessment of the ASTM D2261 TONGUE method. The upper and lower parts of the fabric sample were set to upper and lower clamps of the apparatus according to the assessment of ASTM D2261 TONGUE method, respectively, and the fabric sample was located between the left and right spaces in jaw faces of the clamps. Thereafter, the clamps were located at a distance of 76 mm between the jaw faces thereof and were moved in opposite directions, i.e., the upper and lower directions, respectively, at a speed of 300 mm/min. Then, the tearing strength of the fabric sample was measured when the fabric sample was torn.

(c) Tensile Tenacity and Elongation at Break

A fabric sample was cut from the non-coated fabrics before coating and fixed at the lower clamp of the apparatus for measuring the tensile tenacity according to ASTM D 5034. Thereafter, while moving the upper clamp that holds the upper part of the fabric sample upwardly, the tenacity and the elongation at the time when the fabric sample was broken were measured.

(d) Shrinkage Rate

The shrinkage rates in the directions of warp and weft were measured according to ASTM D 1776. First, the sample was cut from the non-coated fabrics before coating, and the sample was marked to indicate 20 cm that is the length before shrinkage in each direction of warp and weft. Then, after the sample was heat-treated at 149° C. for 1 hour, and the length of the sample after shrinkage was measured. The shrinkage rates (%) in the directions of warp and weft were calculated by the equation of {[(length before shrinkage−length after shrinkage)/(length before shrinkage)]×100}.

(e) Stiffness

The stiffness of the non-coated fabric before coating was measured with a circular bend method by using the apparatus for testing the stiffness according to ASTM D 4032. Furthermore, it is also possible to use a cantilever method for measuring the stiffness of the fabric, which is performed by measuring the bending length of the fabric with a cantilever measuring device having a slope of a certain angle for bending the fabric.

(f) Thickness

The thickness of the non-coated fabric before coating was measured according to ASTM D 1777.

(g) Air Permeability

According to ASTM D 737, after storing the non-coated fabric before coating at the condition of 20° C. and 65% RH for 1 day or more, pressurized air having ΔP of 125 Pa and 500 Pa was applied respectively to a circular cross-section of 38 cm$^2$ and the amount of air passing through the cross-section was measured and shown as static air permeability.

Furthermore, the dynamic air permeability of the non-coated fabric was measured according to the ASTM D 6476 method by using the dynamic air peimeability tester (TEXTEST FX 3350 Dynamic Air Permeability Tester).

TABLE 2

|  |  | Example 1 | Example 2 | Example 3 | Example 4 | Example 5 |
|---|---|---|---|---|---|---|
| Toughness of fabric (kJ/m$^3$) | | 3.6 | 3.75 | 3.9 | 5.2 | 5.6 |
| Tearing strength of fabric (kgf)/non-coated | | 18 | 19 | 20 | 25 | 26 |
| Tearing strength of fabric (kgf)/coated | | 34 | 36 | 38 | 38 | 40 |
| Tensile tenacity of fabric (kgf/inch) | | 220 | 227 | 234 | 290 | 305 |
| Elongation at break of fabric (%) | | 37 | 37 | 39 | 38 | 40 |
| Shrinkage rate of fabric (%) | Warp | 0.7 | 0.5 | 0.5 | 0.4 | 0.5 |
|  | Weft | 0.3 | 0.4 | 0.3 | 0.3 | 0.3 |
| Stiffness (kgf) | | 0.40 | 0.40 | 0.35 | 0.95 | 0.90 |
| Thickness (mm) | | 295 | 294 | 295 | 338 | 338 |
| Static air permeability (cfm) | ΔP = 125 pa | 1.2 | 1.0 | 0.8 | 0.8 | 0.6 |
|  | ΔP = 500 pa | 9.5 | 9.5 | 9.2 | 5.9 | 5.4 |
| Dynamic air permeability (mm/s) | | 650 | 620 | 600 | 470 | 430 |

Comparative Examples 1-5

The polyester fabric of Comparative Examples 1-5 were prepared substantially according to the same method as in Examples 1-5, under the conditions disclosed in the following Table 3.

TABLE 3

|  | Comparative Example 1 | Comparative Example 2 | Comparative Example 3 | Comparative Example 4 | Comparative Example 5 |
|---|---|---|---|---|---|
| PET content (mole %) | 100 | 100 | 100 | 100 | 100 |
| IV of PET chip (dl/g) | 0.80 | 0.85 | 0.90 | 0.80 | 0.85 |
| CEG content of PET chip (meq/kg) | 50 | 47 | 43 | 50 | 47 |
| Spinning temperature (° C.) | 293 | 295 | 297 | 295 | 297 |
| Drawing ratio | 4.95 | 5.03 | 5.10 | 4.95 | 5.03 |
| IV of fiber(dl/g) | 0.60 | 0.62 | 0.67 | 0.60 | 0.62 |
| Toughness of fiber (J/m$^3$) | 59 | 63 | 67 | 59 | 63 |
| Modulus of fiber (at 1% elongation, g/de) | 115 | 119 | 125 | 115 | 119 |
| Modulus of fiber (at 2% elongation, g/de) | 85 | 91 | 93 | 84 | 92 |
| Tensile tenacity of fiber (g/de) | 6.8 | 7.0 | 7.5 | 6.8 | 7.0 |
| Elongation at break of fiber (%) | 10 | 11 | 13 | 11 | 13 |
| Dry heat shrinkage rate (%) | 15.5 | 15 | 13.7 | 15.5 | 15 |
| Fineness of monofilament (DPF) | 7.35 | 6.94 | 6.94 | 10.0 | 9.14 |
| Total fineness (de) | 500 | 500 | 500 | 680 | 680 |
| Number of filaments | 68 | 72 | 72 | 68 | 72 |
| Weaving density (warp × weft) | 49 × 49 | 49 × 49 | 49 × 49 | 43 × 43 | 43 × 43 |

TABLE 3-continued

|  |  | Comparative Example 1 | Comparative Example 2 | Comparative Example 3 | Comparative Example 4 | Comparative Example 5 |
|---|---|---|---|---|---|---|
| Weaving type |  | Plain | Plain | Plain | Plain | Plain |
| Heat-treating/ | 1st | 160 | 160 | 165 | 160 | 165 |
| Vulcanizing temperature (° C.) | 2nd | 160 | 160 | 165 | 160 | 165 |
| Rubber component |  | Liquid silicone | Liquid silicone | Liquid silicone | Liquid silicone | Liquid silicone |
| Amount of coated resin (g/m2) |  | 25 | 25 | 25 | 30 | 30 |

The properties of the polyester fabrics prepared according to Comparative Examples 1-5 are listed in the following Table 4.

TABLE 4

|  |  | Comparative Example 1 | Comparative Example 2 | Comparative Example 3 | Comparative Example 4 | Comparative Example 5 |
|---|---|---|---|---|---|---|
| Toughness of fabric (kJ/m$^3$) |  | 2.5 | 2.7 | 2.9 | 2.7 | 2.9 |
| Tearing strength of fabric (kgf)/non-coated |  | 13 | 14 | 15 | 19 | 20 |
| Tearing strength of fabric (kgf)/coated |  | 21 | 23 | 23 | 23 | 24 |
| Tensile tenacity of fabric (kgf/inch) |  | 189 | 195 | 200 | 195 | 200 |
| Elongation at break of fabric (%) |  | 20 | 21 | 22 | 20 | 22 |
| Shrinkage rate of fabric (%) | Warp | 1.3 | 1.3 | 1.2 | 1.2 | 1.1 |
|  | Weft | 1.2 | 1.0 | 0.9 | 1.0 | 0.9 |
| Stiffness (kgf) |  | 2.1 | 1.9 | 1.8 | 2.3 | 2.3 |
| Thickness (mm) |  | 303 | 305 | 305 | 350 | 350 |
| Static air permeability (cfm) | $\Delta P =$ 125 pa | 2.4 | 2.3 | 2.2 | 2.2 | 2.1 |
|  | $\Delta P =$ 500 pa | 13.5 | 13.3 | 13.0 | 12.6 | 12.5 |
| Dynamic air permeability (mm/s) |  | 1900 | 1850 | 1800 | 1950 | 1850 |

Figure 2:
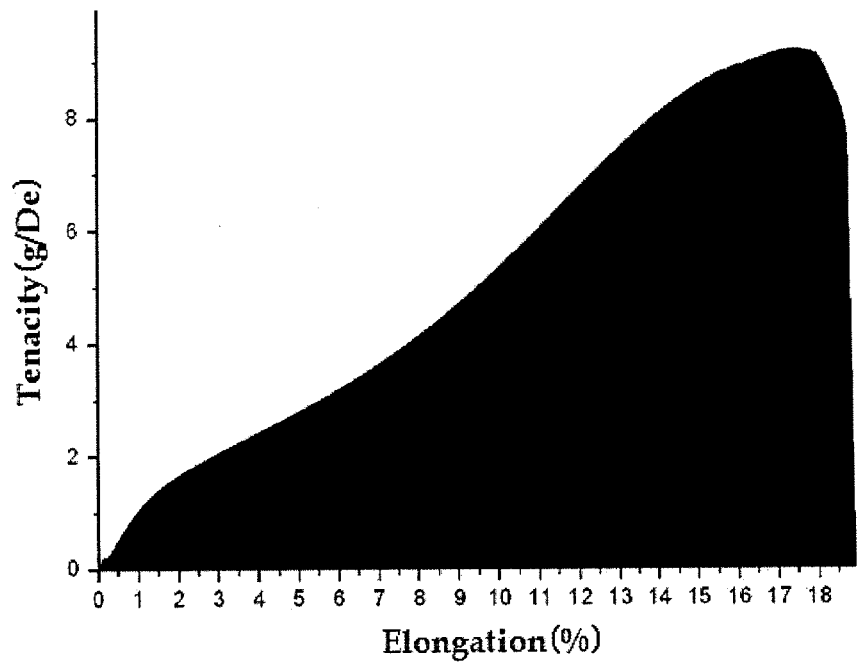
FIG. 2 shows the tenacity-elongation curve of the polyester fiber that is included in the polyester fabric according to Example 1 of the present invention.
Figure 3:
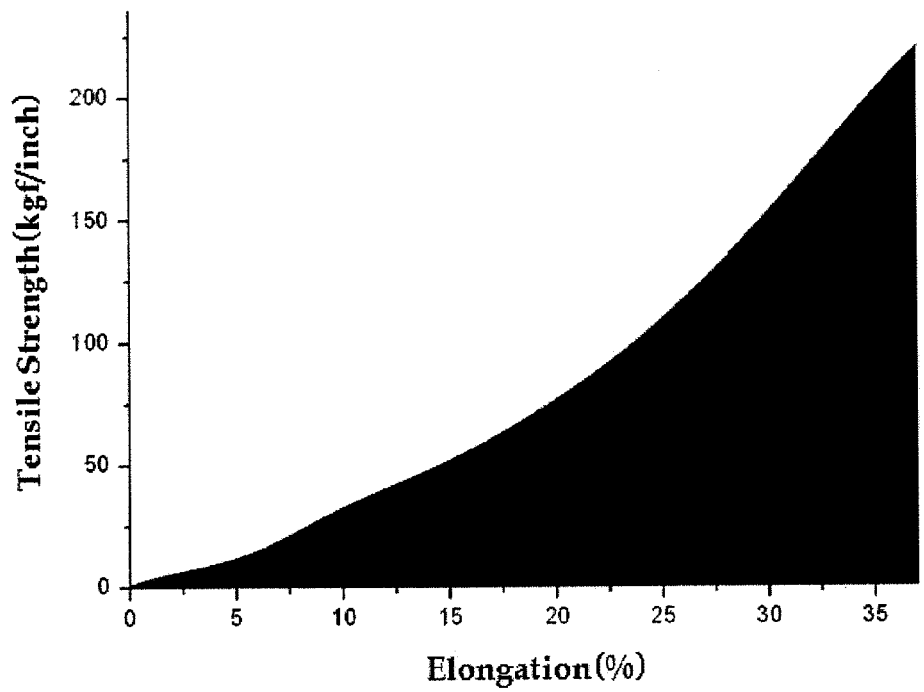
FIG. 3 shows the tenacity-elongation curve of the polyester fabric according to Example 1 of the present invention.
Figure 4:
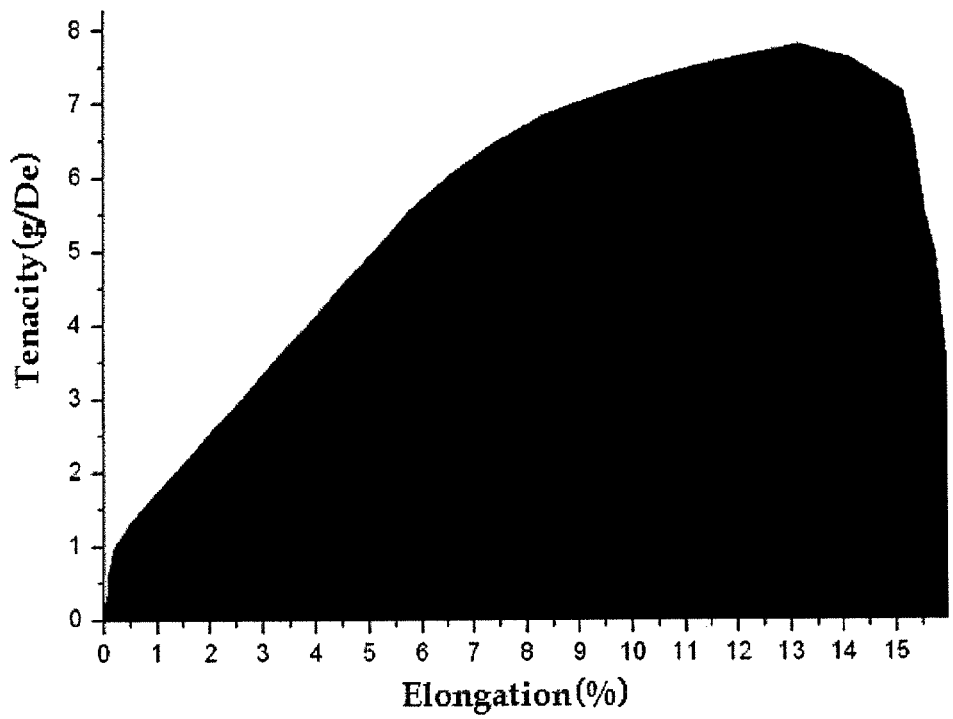
FIG. 4 shows the tenacity-elongation curve of the polyester fiber that is included in the polyester fabric according to Comparative Example 3 of the present invention.
Figure 5:
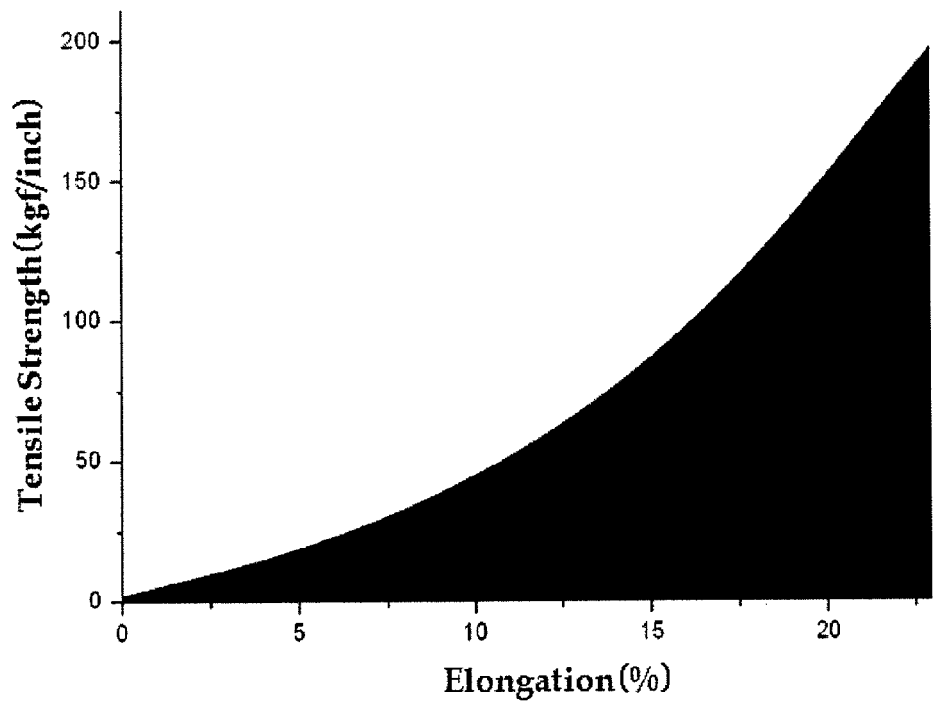
FIG. 5 shows the tenacity-elongation curve of the polyester fabric according to Comparative Example 3 of the present invention.

Furthermore, the tenacity-elongation graphs of the polyester fiber and the fabric including the same according to Example 1 are shown in FIGS. 2 and 3, and the tenacity-elongation graphs of the polyester fiber and the fabric including the same according to Comparative Example 3 are shown in FIGS. 4 and 5.

As shown in Tables 2 and 4, it can be recognized that the polyester fabrics for an airbag of Examples 1-5 of the present invention have toughness and tearing strength in a specific range by using the polyester fibers of high strength, high elongation, and low modulus having toughness of a specific range are superior in the improved fabric shrinkage rate, stiffness, air permeability, and the like in comparison with the fabrics for an airbag of Comparative Examples 1-5 that use prior polyester fibers.

Particularly, it can be recognized that the polyester fabrics for an airbag of Examples 1-5 have the toughness of 3.6 to 5.6 kJ/m$^3$, and the tearing strength of 34 to 40 kgf, and thus the fabric shrinkage rate is 0.7% to 0.3% and very superior. At the same time, it is also recognized that the stiffness of the polyester fabrics for an airbag of Examples 1-5 is 0.35 to 0.95 kgf and the fabrics have superior folding properties and packing properties in addition to superior shape stability and mechanical properties. However, the fabrics for an airbag of Comparative Examples 1-5 using the polyester fibers having low tenacity, low elongation, high fineness of monofilament, and high modulus (Young's modulus) have toughness of 2.5 to 2.9 kJ/m$^3$ and tearing strength of 21 to 24 kgf, and thus the stiffness is 1.8 to 2.3 kgf and the packing properties may be deteriorated because the fabrics become too rigid and hard to fold. Also, the air permeability of the fabrics for an airbag of Comparative Examples 1-5 is high, particularly the dynamic air permeability is 1800 to 1950 mm/s, and it can be recognized that the air-tightness of the fabrics for an airbag is remarkably deteriorated. As such, all of the fabrics for an airbag of Comparative Examples 1-5 show higher values than the fabrics for an airbag of Examples 1-5, and it is recognized that these fabrics have many problems in practically application to the fabric for an airbag.

Furthermore, as shown in FIGS. 2 and 3, the fiber for an airbag according to Example 1 and the polyester fabric including the same show high toughness and low modulus in the tenacity-elongation graphs, and thus it is possible to secure the advantage that the ability to absorb the inflator gas energy of a high temperature and high pressure and the air-tightness of the airbag cushion are good when the airbag is unfolded. On the contrary, as shown in FIGS. 4 and 5, the fiber for an airbag according to Comparative Example 3 and the polyester fabric including the same show low tenacity and high modulus in the tenacity-elongation graphs, and thus they are undesirable for used for the fabric for an airbag because the ability to absorb the inflator gas energy of a high temperature and high pressure is inferior and the air-tightness of the airbag cushion is also bad when the airbag is unfolded.

Experimental Example 1

Airbag cushions were prepared by using the non-coated polyester fabrics that are not coated in Examples 1-5 and Comparative Examples 1-5, and the airbags for a car were prepared as DAB (driver airbag) cushion assemblies or PAB (passenger airbag) cushion assemblies as disclosed in Table 5. The unfolding test (static test) were carried out on the finished airbags for a car with three heat-treating conditions (room temperature: 25° C.×4 hr oven storing, Hot: 85° C.×4 hr oven storing, Cold: −30° C.×4 hr oven storing). As results of the unfolding tests (static tests), if there was no tearing of fabric, existence of pin holes, and carbonization of fabric, the tests were evaluated as "Pass", and if there were any one of tearing of fabric, existence of pin holes, and carbonization of fabric, the tests were evaluated as "Fail".

The results of the unfolding tests (static tests) on the non-coated polyester fabrics for an airbag of Examples 1-5 and Comparative Examples 1-5 are listed in Table 5.

TABLE 5

| Classifications | Type of cushion | Pressure of gunpowder inflator (kPa) | Room Temp. Unfolding test | Hot Unfolding test | Cold Unfolding test |
|---|---|---|---|---|---|
| Example 1 | DAB | 180 | Pass | Pass | Pass |
| Example 2 | DAB | 180 | Pass | Pass | Pass |
| Example 3 | DAB | 180 | Pass | Pass | Pass |
| Example 4 | PAB | 220 | Pass | Pass | Pass |
| Example 5 | PAB | 220 | Pass | Pass | Pass |
| Comparative Example 1 | DAB | 180 | Fail | Fail | Fail |
| Comparative Example 2 | DAB | 180 | Fail | Fail | Fail |
| Comparative Example 3 | DAB | 180 | Fail | Fail | Fail |
| Comparative Example 4 | PAB | 220 | Fail | Fail | Fail |
| Comparative Example 5 | PAB | 220 | Fail | Fail | Fail |

As shown in Table 5, the airbags for a car including the polyester fabrics for an airbag of Examples 1-5 according to the present invention have toughness and tearing strength in a specific range by using the polyester fibers of high strength, high elongation, and low modulus having the toughness in a specific range do not show the tearing of fabric, the existence of pin holes, or the carbonization of fabric, and it can be recognized that all of the cushions have superior performance as the airbag for a car from the results of the unfolding tests after storing the airbags in three different heat-treating temperature conditions.

On the contrary, in the results of the unfolding tests on the airbags for a car including the fabric for an airbag of Comparative Examples 1-5 that use prior polyester fibers, there was tearing of fabric, existence of pin holes, and carbonization of fabric when the airbag is unfolded, and it can be recognized that all of the cushions are evaluated as "Fail" and it is impossible to use them as practical airbags. Particularly, the unfolding tests on the DAB (driver airbag) cushion assemblies including the fabrics of Comparative Examples 1-3 show tearing of fabric at the outer margin to the seam of the cushion, the test on the cushion of Comparative Example 4 shows tearing of fabric at the entrance of the inflator, and the test on the cushion of Comparative Example 5 shows tearing of fabric at the margin to the seam of the main panel. Furthermore, it can be recognized that the tearing of fabric is caused by the pin holes at the sewing part and the carbonization of the fabric, in the unfolding tests of the airbag for a car including the fabrics of Comparative Examples 1-5. Therefore, when the fabrics for an airbag of Comparative Examples 1-5 are used as practical airbag cushions for a car, the airbag may burst and cause a huge danger in its function.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A polyester fabric for an airbag, having toughness of 3.5 to 6.0 kJ/m³ defined by Calculation Formula 1, and tearing strength measured according to ASTM D 2261 TONGUE method of 18 to 30 kgf, wherein the fabric includes a polyester fiber having toughness defined by Calculation Formula 1 of 70 to 95 J/m²:

$$\text{Toughness(Work of rupture)} = \int_0^{break} F \cdot dl \qquad \text{Calculation Formula 1}$$

wherein

F represents the load that is provided to the polyester fiber or fabric until the length of the fiber or the fabric is elongated as much as dl, and dl represents the elongated length of the polyester fiber or fabric; and wherein the polyester fiber has Young's modulus of 60 to 100 g/de at 1% of elongation and 20 to 60 g/de at 2% of elongation, which is measured according to the ASTM D 885 method.

2. The polyester fabric according to claim 1, wherein stiffness measured according to the ASTM D 4032 method is 1.5 kgf or less.

3. The polyester fabric according to claim 1, wherein static air permeability measured according to the ASTM D 737 method is 10.0 cfm or less when ΔP is 125 Pa, and 14 cfm or less when ΔP is 500 Pa.

4. The polyester fabric according to claim 1, wherein dynamic air permeability measured according to the ASTM D 6476 method is 1700 mm/s or less.

5. The polyester fabric according to claim 1, wherein the polyester fiber has 110 or more filaments and fineness of the monofilament of 2.9 to 6.0 DPF.

6. The polyester fabric according to claim 1, wherein the polyester fiber has tensile tenacity of 8.3 g/de or more, elongation at break of 14% to 24%, and a dry heat shrinkage rate of 1.0% to 6.5%.

7. The polyester fabric according to claim 1, wherein the polyester fiber has Young's modulus of 75 to 95 g/de at 1% of elongation and 75 to 95 g/de at 2% of elongation, which is measured according to the ASTM D 885 method.

8. The polyester fabric according to claim 1, wherein the polyester fiber is prepared from polyester chips having intrinsic viscosity of 1.05 to 1.40 dl/g.

9. The polyester fabric according to claim 1, wherein the fabric is coated with at least one rubber component selected from the group consisting of a powder-type silicone, a liquid-type silicone, polyurethane, chloroprene, a neoprene rubber, and an emulsion type silicone resin.

10. The polyester fabric according to claim 9, wherein the coating amount of the rubber component per unit area is 20 to 200 g/m².

11. A method of preparing the polyester fabric for an airbag according to claim 1, including the steps of:

weaving a raw fabric for an airbag with a polyester fiber;

scouring the woven raw fabric for an airbag; and tentering the scoured fabric, wherein the polyester fiber has toughness defined by Calculation Formula 1 of 70 to 95 J/m$^3$ and Young's modulus of 60 to 100 g/de at 1% of elongation and 20 to 60 g/de at 2% of elongation, which is measured according to the ASTM D 885 method.

12. The method of preparing the polyester fabric according to claim 11, wherein the heat-treating temperature in the tentering step is 140 to 210° C.

13. An airbag for a car, including the polyester fabric for an airbag according to claim 1.

14. The airbag according to claim 13, which is a frontal airbag or a side curtain airbag.

\* \* \* \* \*